United States Patent
Zhang et al.

(10) Patent No.: US 10,404,677 B2
(45) Date of Patent: *Sep. 3, 2019

(54) SECURE METHOD FOR MTC DEVICE TRIGGERING

(71) Applicant: NEC Corporation, Tokyo (JP)

(72) Inventors: Xiaowei Zhang, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,323

(22) Filed: Sep. 27, 2018

(65) Prior Publication Data

US 2019/0028454 A1    Jan. 24, 2019

Related U.S. Application Data

(63) Continuation of application No. 15/829,220, filed on Dec. 1, 2017, now Pat. No. 10,122,700, which is a (Continued)

(30) Foreign Application Priority Data

Oct. 28, 2011    (JP) .................................. 2011-236699

(51) Int. Cl.
*H04L 29/06*    (2006.01)
*H04W 4/70*    (2018.01)
(Continued)

(52) U.S. Cl.
CPC .......... *H04L 63/08* (2013.01); *H04L 63/1416* (2013.01); *H04L 63/20* (2013.01);
(Continued)

(58) Field of Classification Search
CPC ....... H04W 68/00; H04W 4/70; H04W 12/06; H04W 12/08; H04W 12/10; H04L 63/08;
(Continued)

(56) References Cited

U.S. PATENT DOCUMENTS 9,131,467 B2    9/2015 Li et al.
2005/0027985 A1    2/2005 Sprunk et al.
(Continued)

FOREIGN PATENT DOCUMENTS

CN    102137397    4/2014
EP    2 209 253 A1    7/2010
(Continued)

OTHER PUBLICATIONS

Office Action dated Mar. 25, 2016 by the Russian Patent Office in counterpart Russian Patent Application No. 2014116253.
(Continued)

*Primary Examiner* — Wayne H Cai
(74) *Attorney, Agent, or Firm* — Finnegan, Henderson, Farabow, Garrett & Dunner, L.L.P.

(57) ABSTRACT

Upon receiving a triggering message from a MTC server (20), a network (10) verifies if the MTC server (20) is authorized to trigger a target MTC device (30) and also if the MTC device (30) is authorized to respond the triggering message, by comparing an MTC device ID and MTC server ID (and optionally information on subscription) which are include in the triggering message with authorized ones. Upon succeeding in the verification, the network (10) checks a trigger type included in the triggering message to verify if the triggering message is authorized to be sent to the MTC device (30). Upon succeeding in the check, the network (10) forwards the triggering message to the MTC device (30). The network (10) also validates a response from the MTC device (30), by checking whether the MTC device (30) is allowed to communicate with the addressed. MTC server (20).

12 Claims, 11 Drawing Sheets

Related U.S. Application Data continuation of application No. 15/375,032, filed on Dec. 9, 2016, now Pat. No. 9,894,054, which is a continuation of application No. 14/351,681, filed as application No. PCT/JP2012/006925 on Oct. 29, 2012, now Pat. No. 9,549,320.

(51) Int. Cl.
| | | |
|---|---|---|
| *H04W 12/08* | (2009.01) | |
| *H04W 12/10* | (2009.01) | |
| *H04W 12/06* | (2009.01) | |
| *H04W 68/00* | (2009.01) | |

(52) U.S. Cl.
CPC ............ *H04W 4/70* (2018.02); *H04W 12/06* (2013.01); *H04W 12/08* (2013.01); *H04W 12/10* (2013.01); *H04L 63/0876* (2013.01); *H04L 63/101* (2013.01); *H04L 63/12* (2013.01); *H04L 63/123* (2013.01); *H04L 63/205* (2013.01); *H04W 68/00* (2013.01)

(58) Field of Classification Search
CPC ... H04L 63/20; H04L 63/1416; H04L 63/101; H04L 63/123; H04L 63/205; H04L 63/12; H04L 63/0876
See application file for complete search history.

(56) References Cited

U.S. PATENT DOCUMENTS

| | | |
|---|---|---|
| 2005/0037736 A1 | 2/2005 | Jung |
| 2006/0014532 A1 | 1/2006 | Seligmann et al. |
| 2012/0243422 A1 | 9/2012 | Jokimies et al. |
| 2012/0252481 A1 | 10/2012 | Anpat et al. |
| 2014/0219182 A1 | 8/2014 | Chandramouli et al. |
| 2014/0220987 A1 | 8/2014 | Wu |
| 2014/0317195 A1 | 10/2014 | Xu |

FOREIGN PATENT DOCUMENTS

| | | |
|---|---|---|
| EP | 2 268 070 A1 | 12/2010 |
| RU | 2316143 C2 | 9/2005 |
| RU | 2326509 C2 | 11/2005 |
| RU | 2004 124 545 A | 1/2006 |
| RU | 2010143552 | 10/2012 |
| RU | 2010143552 A | 10/2012 |
| WO | WO 2012/107485 A1 | 8/2012 |

OTHER PUBLICATIONS

HTC, "Load/Overload Control via MTC-IWF", SA WG2 Meeting #87, S2-114523, pp. 1-5, Sep. 2011.
Korea Telecom, "Device triggering during suppression", SA WG2 Meeting #86, S2-113350, pp. 1-5, Jul. 2011.
Decision to Grant a Patent dated Dec. 1, 2015 by the Japanese Patent Office in counterpart Japanese Patent Application No. 2014-536422.
KPN, KDDI, "Batch wise triggering", 3GPP TSG SA WG2 Meeting #86, S2-113445, pp. 1-6, Jul. 2011.
HTC, "Device Trigger with requested MTC features provisioning", 3GPP TSG SA WG2 Meeting #85, S2-112260, pp. 1-8, May 2011.
Office Action dated Mar. 24, 2015 by the Japanese Patent Office in counterpart Japanese Patent Application No. 2014-536422.

"3rd Generation Partnership Project; Technical Specification Group Services and System Aspects; System Improvements for Machine-Type Communications; (Release 11)", 3GPP Standard; 3GPP TR 23.888, v1.4.0, pp. 1-139, Aug. 2011.
"3rd Generation Partnership Project; Technical Specification Group Services and System Aspects; System Improvements for Machine-Type Communications; (Release 11)," 3GPP Standard; 3GPP TR 23.888, v1.5.0, pp. 1-155, Oct. 2011.
Sierra Wireless, "Update to MTC Device Trigger Gateway solution," 3GPP TSG SA WG2 Meeting #84, S2-111440, pp. 1-5, Apr. 2011.
"3rd Generation Partnership Project; Technical Specification Group Services and System Aspects; Security aspects of Machine-Type Communications; (Release 11)", 3GPP Standard; 3GPP TR 33.868, v0.5.0, pp. 1-29, Jul. 2011.
ZTE Corporation," SIMTC—Discussion of secure MTC device triggering", 3GPP TSG SA WG3 (Security) Meeting #64, S3-110692, pp. 1-2, Jul. 2011.
International Search Report dated Jun. 24, 2013.
Extended European Search Report dated Jul. 26, 2017, by the European Patent Office in counterpart European Patent Application No. 17165304.1.
Huawei et al.; "MTC trigger interface", 3GPP TSG-SA3 (Security), SA3#63, Draft; S3-110361, Apr. 2, 2011, 3 pages, (2011).
Informational Search Report dated May 19, 2017, by the Patent Office of the Russian Federation in counterpart Russian Patent Application No. 2016128370/12(044275).
3GPP TR 33.868 V0.8.0 (May 2012), "Technical Specification Group Services and System Aspects; Security aspects of Machine-Type Communications", (Release 11), Technical Report, pp. 1-48, (2012).
Non-Final Office Action dated Jun. 6, 2018, in U.S. Appl. No. 15/829,127.
HTC: "Load/Overload Control via MTC-IWF", 3GPP Draft; S2-114140-SIMTC-Overload-V1, 3rd Generation Partnership Project (3GPP), Mobile Competence Centre : 650, Route Des Lucioles ; F-06921 Sophia-Antipolis Cedex ; France, vol. SA WG2, No. Jeju Island; Oct. 10, 2011, Oct. 4, 2011.
HTC: "Solution of Suppressing Device Trigger", 3GPP Draft; S2-112259 Suppresstrigger, 3rd Generation Partnership Project(3GGP), Mobile Competence Centre ; 650, Route Des Lucioles ; F-06921 Sophia-Antipolis Cedex ; France, vol. SA WG2, No. Xi ' An; May 16, 2011, May 11, 2011.
Notification of Reasons for Refusal dated Aug. 14, 2018, by Japanese Patent Office in counterpart Japanese Patent Application 2017-223452.
Notification of Reasons for Refusal dated Aug. 14, 2018, by Japanese Patent Office in counterpart Japanese Patent Application 2017-223453.
SA WG2 Meeting #87, "On-line Device Trigger Conclusion Proposal", Ericsson, ST-Ericsson, S2-114034, pp. 1-8, (2011).
3GPP TSG SA WG2 Meeting #79, "Two Solutions for Online Small Data Transmission", LG Electronics, TD S2-102524, pp. 1-5, (2010).
Russian Search Report from the Russian Patent Office dated May 31, 2018, in counterpart Russian Patent Application No. 2017138240/12(066761).
3GPP TR 23.887 V0.4.0 (Nov. 2012) Technical Report, 3rd Generation Partnership Project; Technical Specification Group Services and System Aspects, Machine-Type and other Mobile Data Applications, Communications Enhancements (Release 12).
Decision to Grant a Patent dated Dec. 4, 2018, by the Japanese Patent Office in counterpart Japanese Patent Application 2017-223452.
Hitachi, KDDI, KPN, "Using Cell Broadcast for Device Triggering", 3GPP TSG-SA WG2#87, S2-114589, pp. 1-9, (2011).

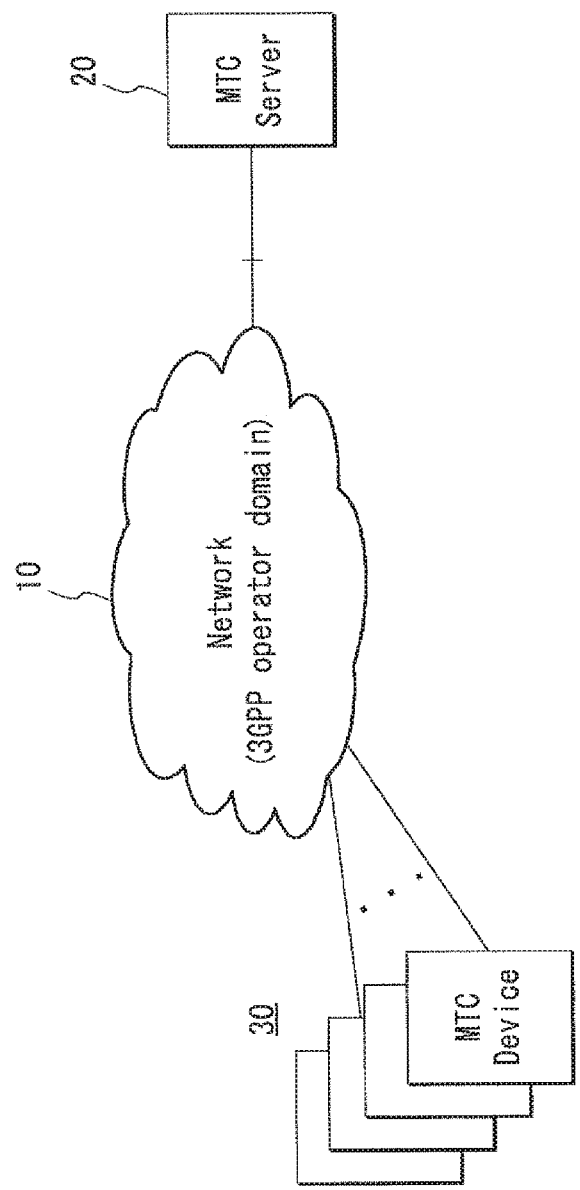

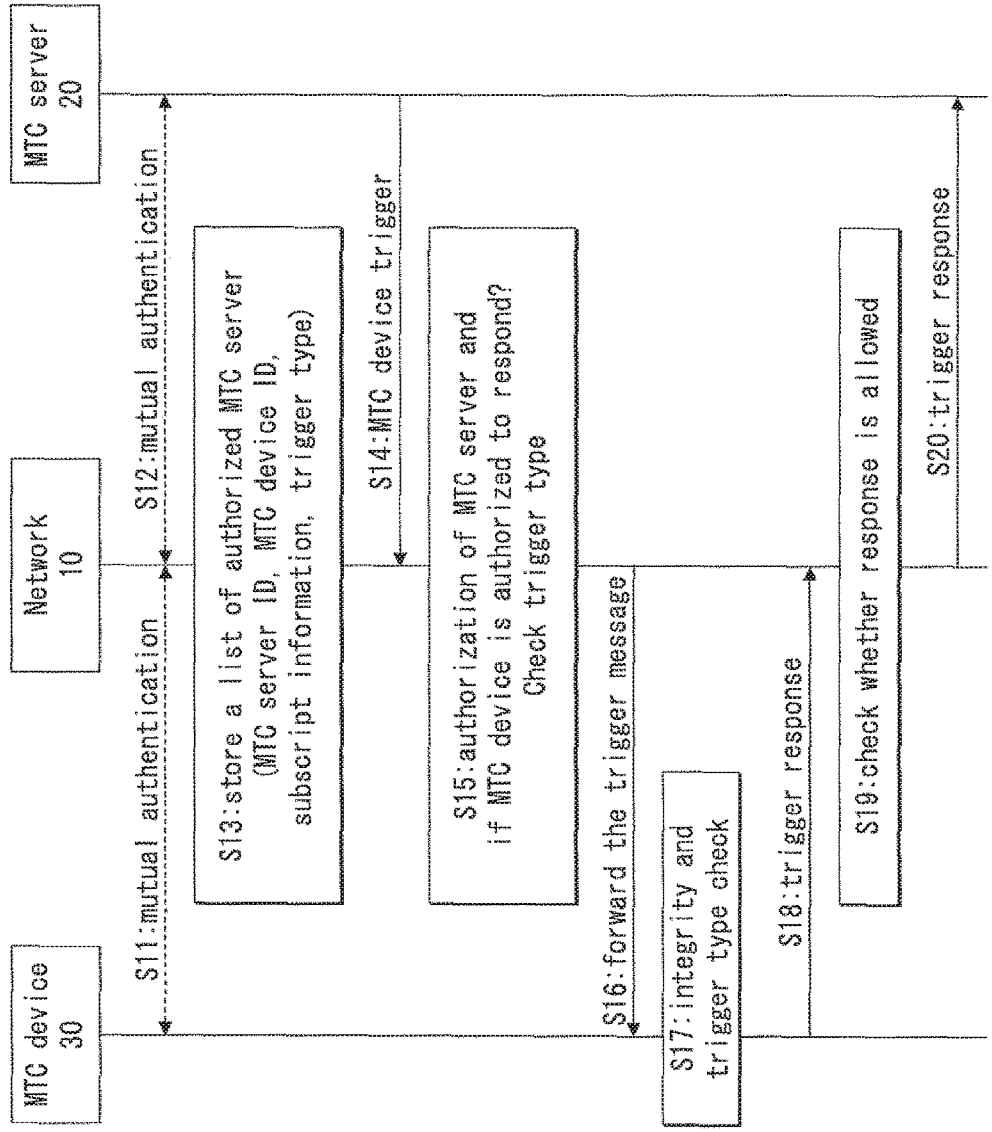

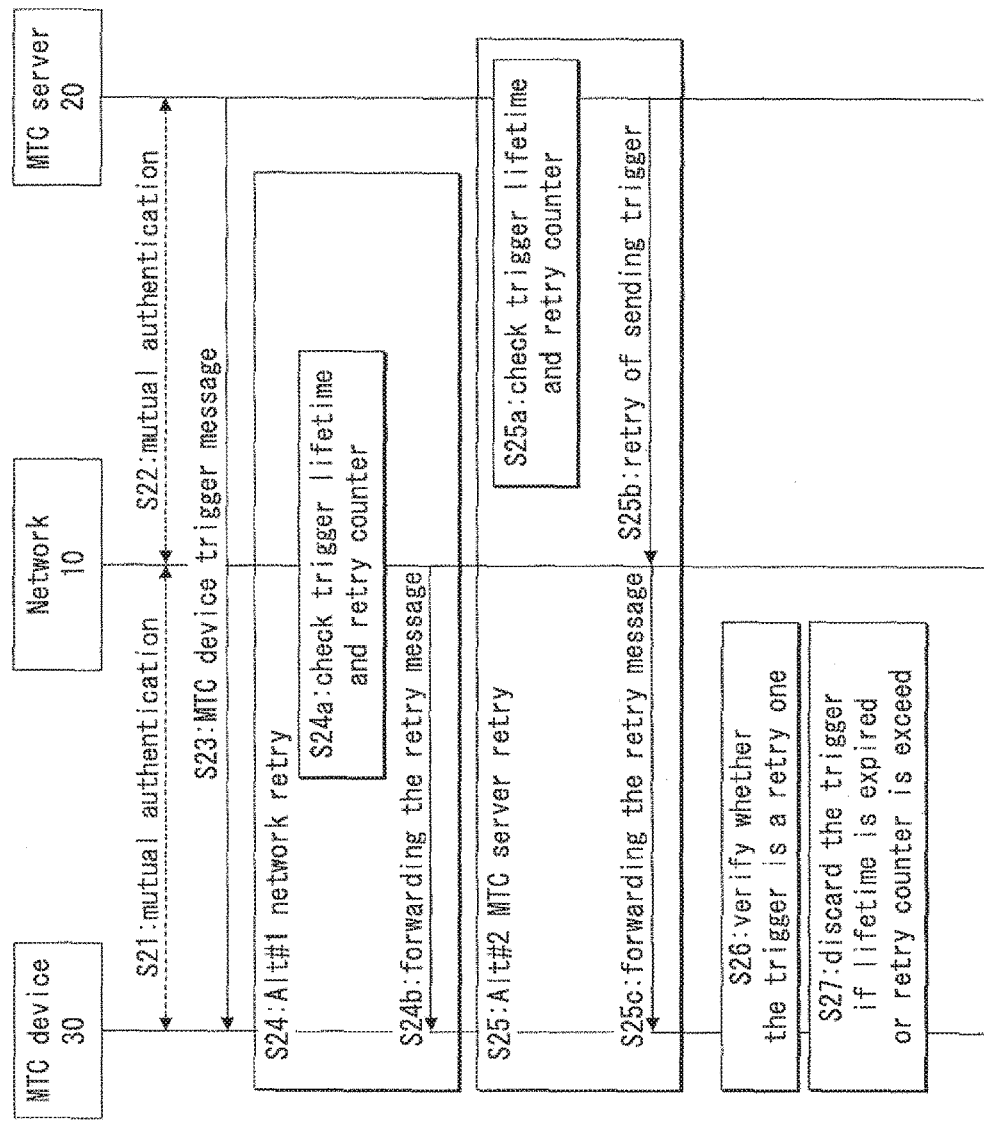

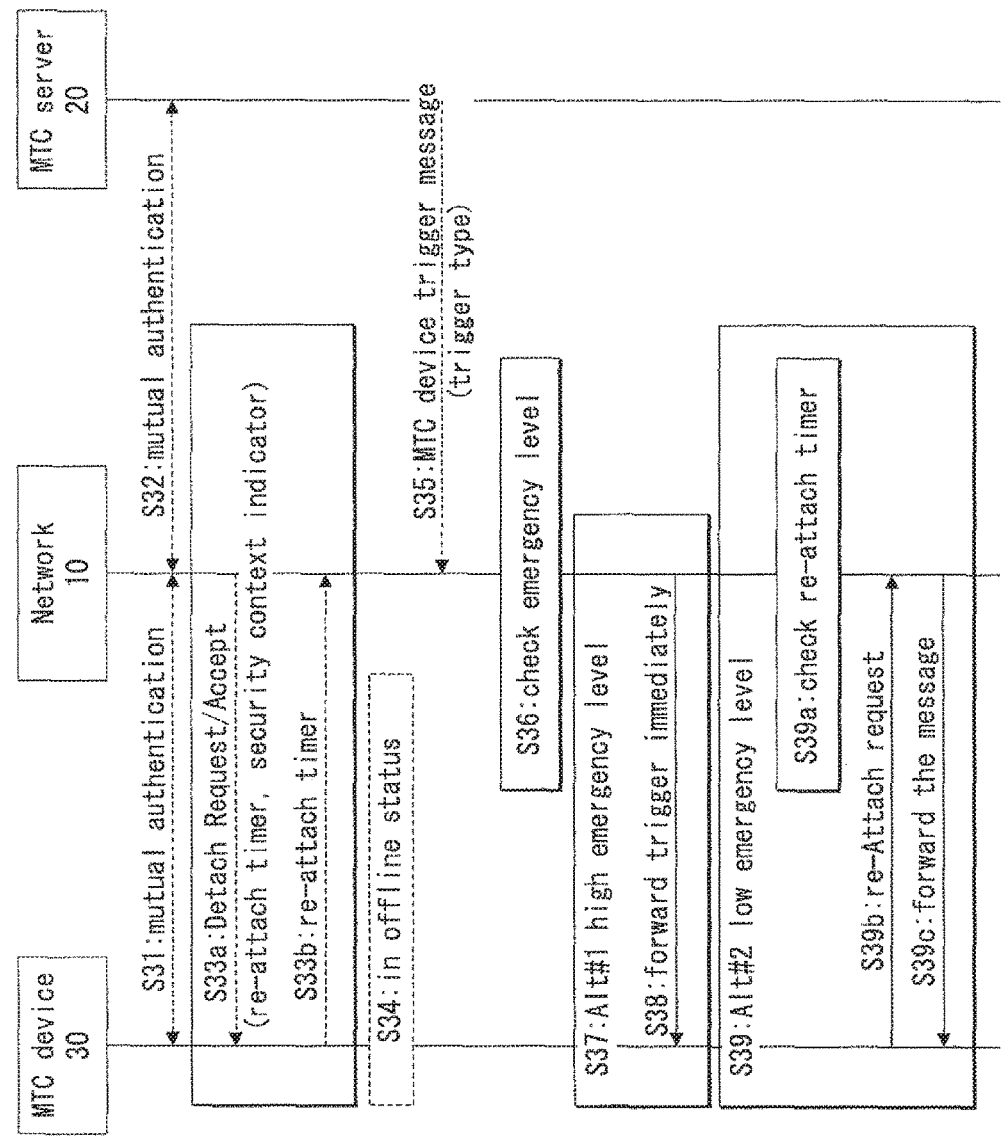
[Fig. 4]

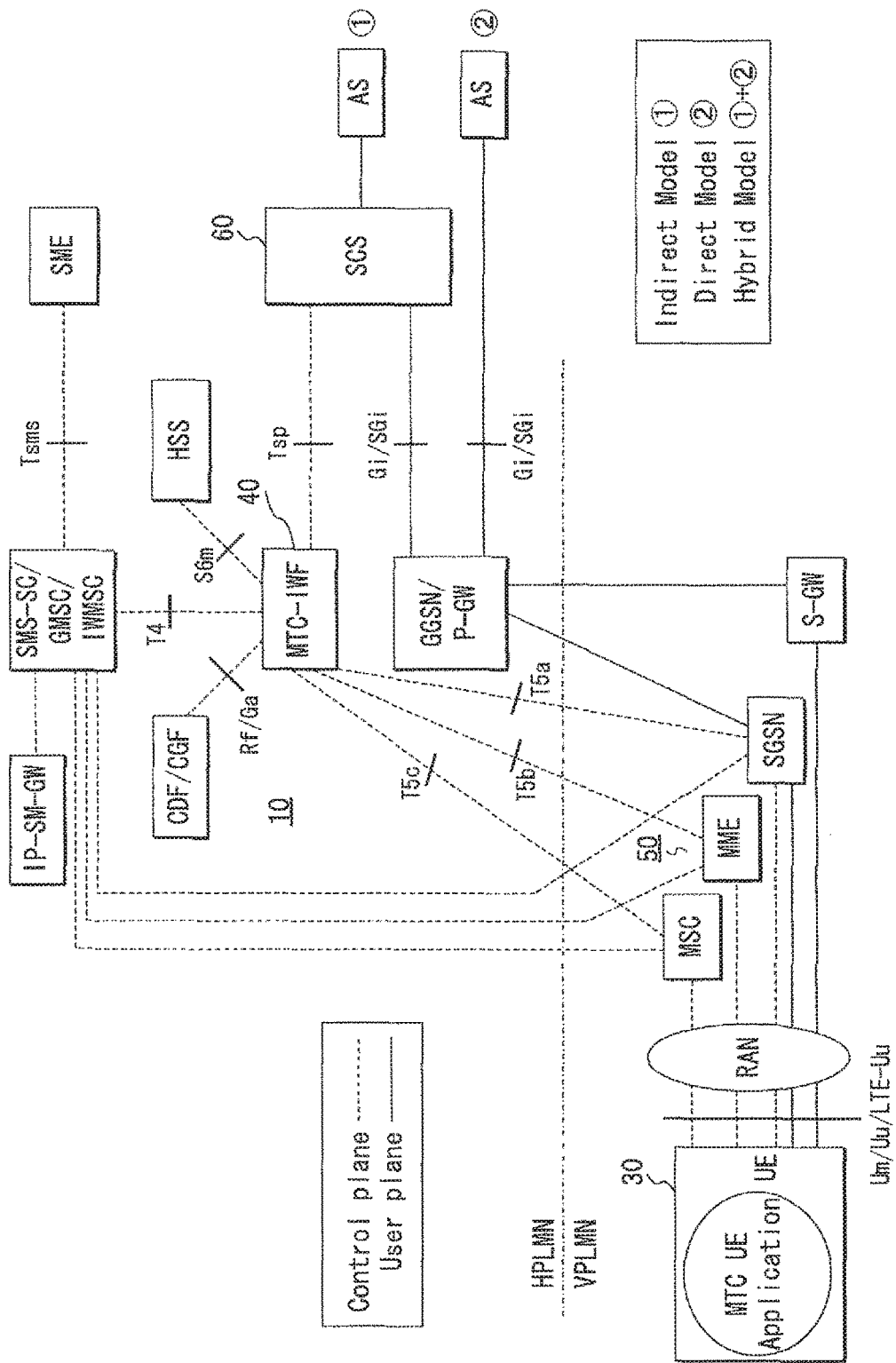
[Fig. 5]

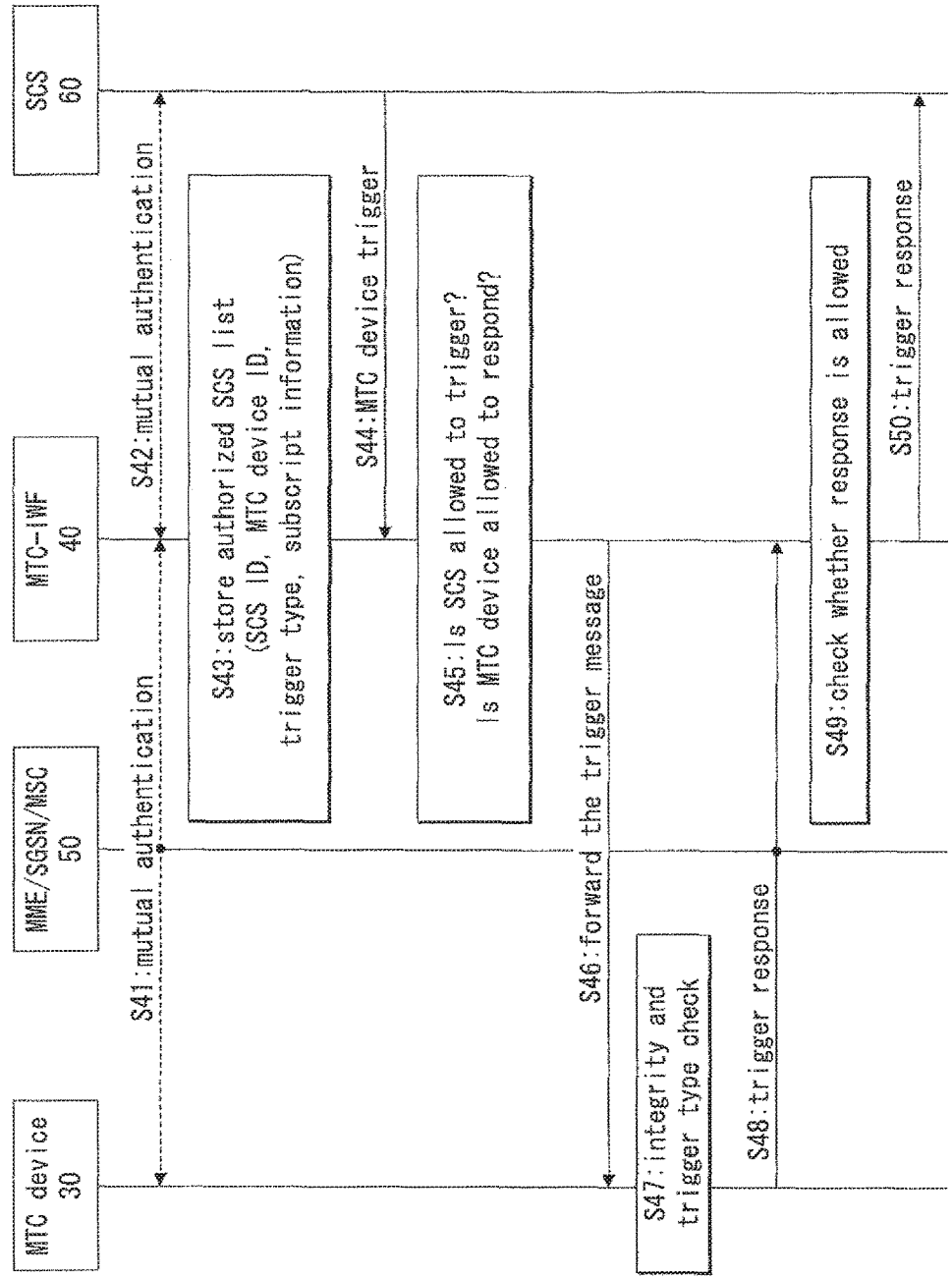

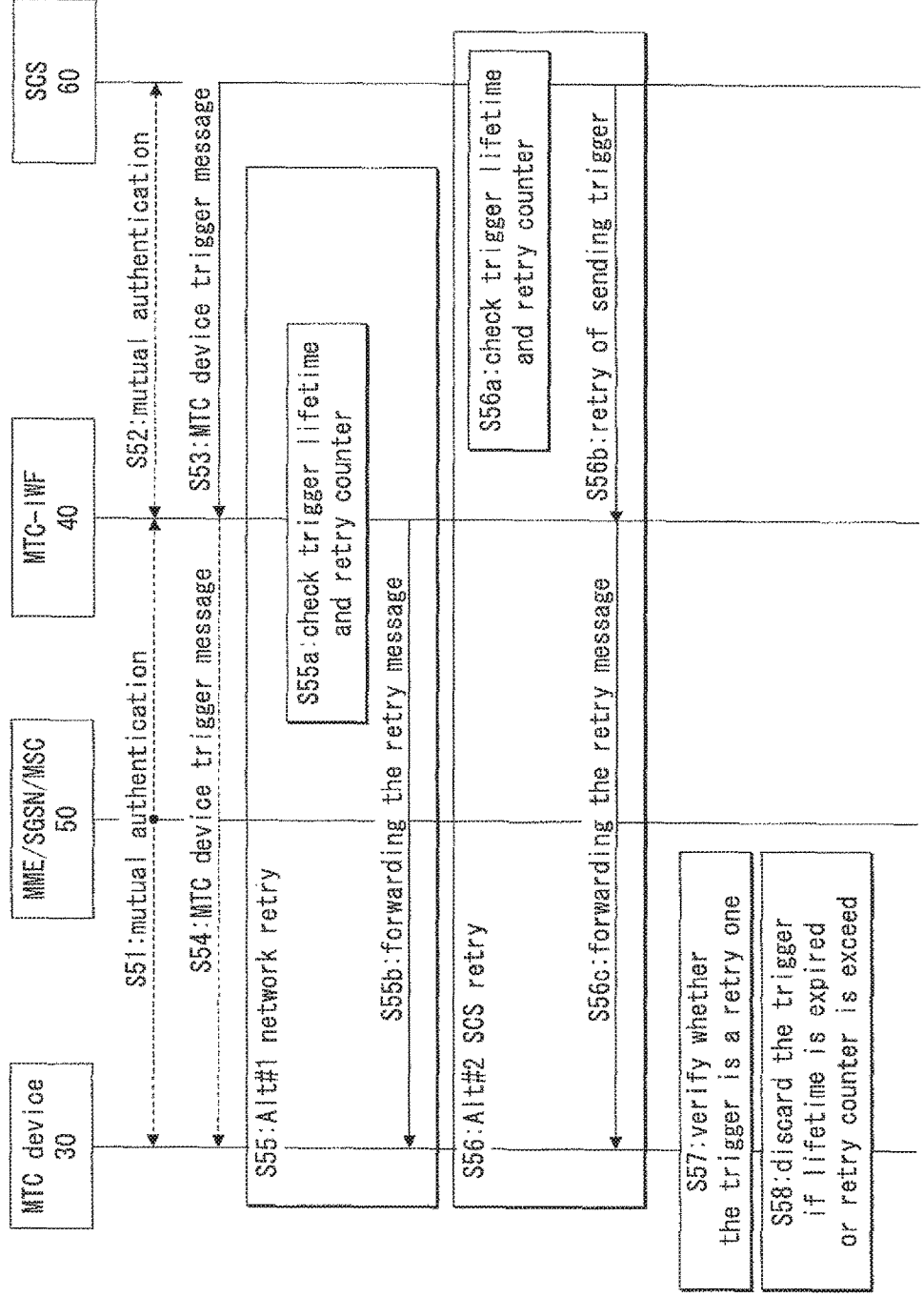

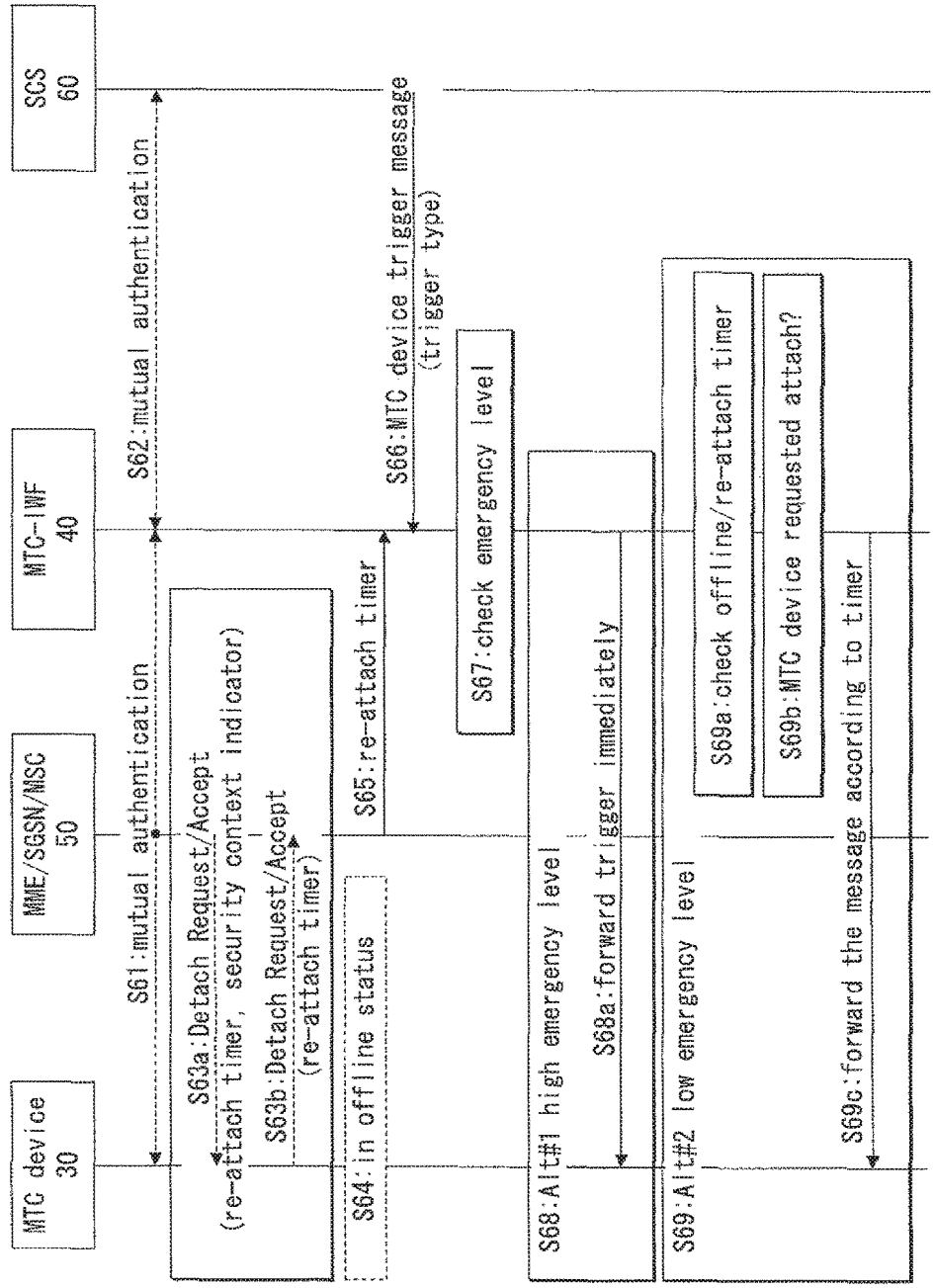

[Fig. 9]
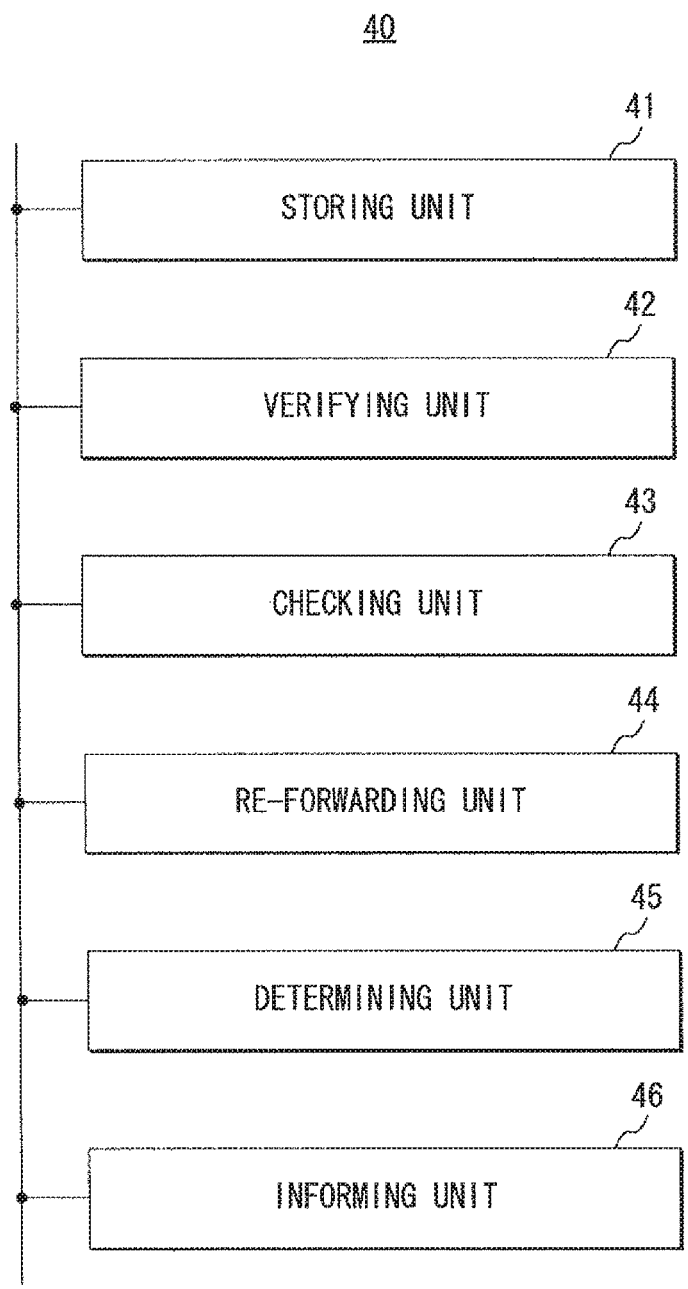

[Fig. 10]
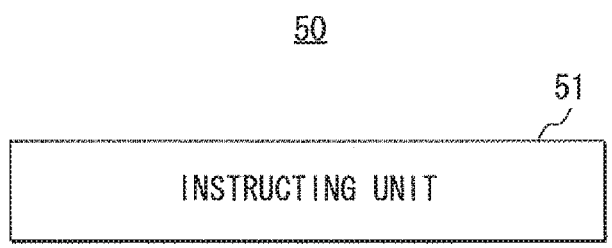
[Fig. 11]
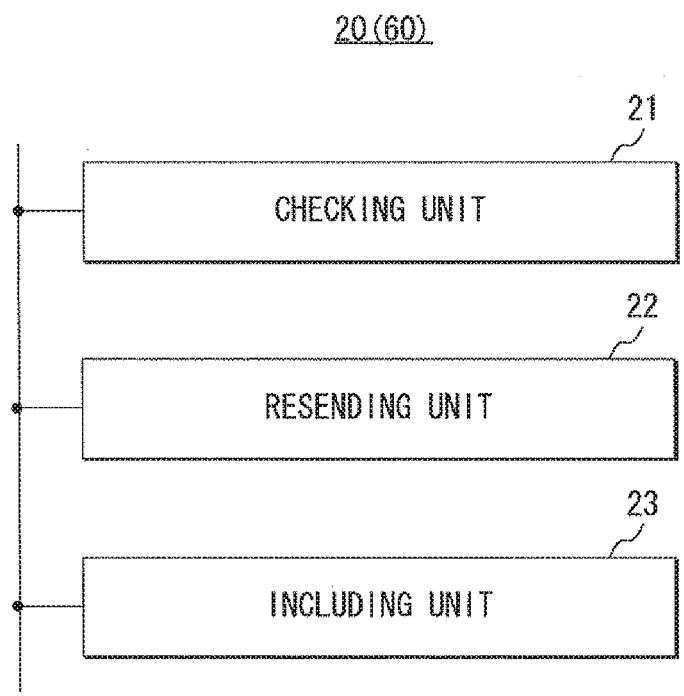

[Fig. 12]
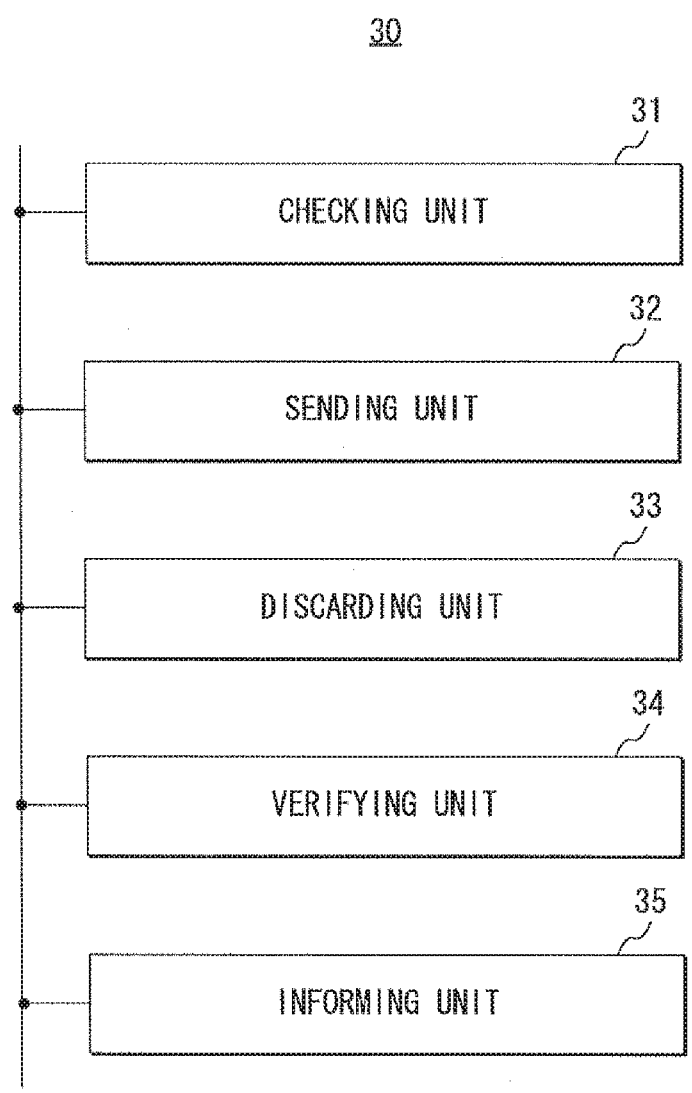

SECURE METHOD FOR MTC DEVICE TRIGGERING

CROSS-REFERENCE TO RELATED PATENT APPLICATIONS

This application is a continuation of U.S. application Ser. No. 15/829,220, filed Dec. 1, 2017, which is a continuation of U.S. application Ser. No. 15/375,032, filed on Dec. 9, 2016 (now U.S. Pat. No. 9,894,054), which is a continuation of U.S. application Ser. No. 14/351,681, filed on Apr. 14, 2014 (now U.S. Pat. No. 9,549,320), which is a National Stage Entry of International Application No. PCT/JP2012/006925, filed Oct. 29, 2012, which claims priority from Japanese Patent Application No. 2011-236699, filed Oct. 28, 2011. The entire contents of the above-referenced applications are expressly incorporated herein by reference.

TECHNICAL FIELD

The present invention relates to secure means for Machine-Type-Communication (MTC) device triggering, including secure delivery, of authorized MTC device triggering, failure handling such as retry of sending the triggering from network and MTC server to MTC device, and a method for triggering detached (or so-called offline) MTC device.

BACKGROUND ART

MTC device triggering is one of features defined by the Third. Generation Partnership Project's (3GPP's) Long Term Evolution-Advanced (LTE-A), as disclosed in Non Patent Literature (NPL) 1. The MTC device triggering is initiated by MTC server to network and terminated at MTC device. MTC server can be in or out of 3GPP network domain. A rouge MTC server may send many MTC device triggering messages to overload the network. Moreover, if MTC device responds to un-authorized triggering, it will cause battery consumption, sending of data towards the rouge MTC server and potential mis-behaviour/mis-configuration of the MTC device. Therefore only valid triggering from authorized MTC server should be sent to MTC device. Thus the MTC server should be able to establish security association with the 3GPP network and MTC device to have end-to-end security between them. On the other hand, it is also possible that rogue UEs (User Equipments) or MTC devices respond to triggering, this should be prevented by allowing only authorized devices to respond to triggering or developing solutions to check device authorization. It is also possible that the MTC device triggering is not received by the target MTC device clue to issues like network failure. In order to reduce traffic, both the MTC server and the network should be able to resend the triggering.

CITATION LIST

Non Patent Literature

[NPL 1] 3GPP TR 23.888, "System Improvements for Machine-Type Communications; (Release 11)", V1.4.0, 2011 August

SUMMARY OF INVENTION

Technical Problem

Assume that the MTC server and the 3GPP network are mutually authenticated. Now, based on the background art given above, the issues to be solved are the following 1 to 7.

1. Network should be able to authorize messages from NTC server and validate the triggers. This is to prevent unauthorized behavior of MTC servers.
2. Network should be able to distinguish between different types of triggers so that triggers are sent only to authorized MTC devices based on their subscription.
3. Network congestion impact from trigger should be avoided.
4. MTC device should be able to validate trigger and its source so as to prevent attack or any impact on MTC device from unauthorized MTC servers and 2.0 messages.
5. Trigger freshness and lifetime solution should exist so as to prevent replay attack and network overload due to re-sending of trigger.
6. Trigger aggregation and security should be considered so as to decrease traffic in the network.
7. To avoid any other issues, the solution should be capable of taking care of failure handling, which includes retry of sending the trigger and sending notification to MTC user.

Solution to Problem

An aspect of this invention considers MTC device triggering which is indicated by MTC server via the 3GPP network. The MTC server can be out of 3GPP network and only authorized triggering sent from identified and authorized MTC server will be indicated to MTC device. In the same way, only authenticated and authorized MTC device will be allowed to respond to a valid triggering. Both network and MTC device will be able to authorize the MTC server and the triggers from it.

The MTC server which is out of 3GPP network domain is required to establish security association with MTC device even if secure communication exists with the 3GPP network. The triggering content will be protected and MTC device will be able to validate the trigger where validation means being able to check: the message integrity, the source of trigger, whether replayed or not, that the message is within the lifetime and that the trigger is of the type to which the MTC device should take action on. MTC device may deploy a list of authorized MTC servers, and MTC device can verify according to the list upon receiving a triggering. To prevent receiving maliciously sent triggers, network will be able to distinguish the trigger type.

The triggering message may have a lifetime such that it will not be simply copied and re-used by an attacker later. Upon network failure or otherwise, MTC server can resend the triggering message. Similarly, network can resend the MTC device within the trigger lifetime. Both MTC server and network provide solutions that prevent trigger replay attack.

MTC device can be in detached status (or so-called offline) to save energy. Network can send MTC device a timer to attach in either Detach Accept or Detach Request towards MTC device, thus when the network receives MTC device triggering from MTC server, it can check the validity of the timer. If the timer is valid, network will hold the triggering and wait till MTC device's attach, if not, network can send the triggering in the same way as MTC device is attached (or so-called online). The timer can be defined on subscription or can also be communicated to the network by the MTC server.

Advantageous Effects of Invention

According to the present invention, the unnecessary network traffic can be reduced and also the waste of battery consumption of MTC device can be reduced, by preventing to send invalid triggering message.

Authorization of MTC server and MTC device according to the triggering will prevent invalid triggering message sent towards to MTC device, which can be from a rogue MTC server or a MTC server which is not authorized to trigger the MTC device, or to a MTC device which is not authorized to respond to the triggering.

One solution can be making MTC device perform periodic Attach Request to check if there is any triggering is sent to it. But this also results in unnecessary battery consumption and traffic. If the MTC server knows when it will trigger the MTC device, it can make the MTC device attach to network or staying idle, depends on the trigger frequency.

Securely retry of sending the triggering from network to MTC device will prevent interference with MTC server and any misuse of the triggering message.

MTC device in detach (or offline) should not be always triggered as soon as the triggering message is received by the network. However, network can determine when to send the triggering message depends on the emergency status and invalidity of the timer for attach that network allocated to MTC device.

Trigger is securely delivered to the MTC device by performing authorization of MTC server, trigger message and also integrity and confidentiality protection of the message.

BRIEF DESCRIPTION OF DRAWINGS

FIG. 1 is a block diagram showing a configuration example of a system according to a first exemplary embodiment of the present invention.

FIG. 2 is a sequence chart showing a first operation example in the system according to the first exemplary embodiment.

FIG. 3 is a sequence chart showing a second operation example in the system according to the first exemplary embodiment.

FIG. 4 is a sequence chart showing a third operation example in the system according to the first exemplary embodiment.

FIG. 5 is a block diagram showing a configuration example of a system according to a second exemplary embodiment of the present invention.

FIG. 6 is a sequence chart showing a first operation example in the system according to the second exemplary embodiment.

FIG. 7 is a sequence chart showing a second operation example in the system according to the second exemplary embodiment.

FIG. 8 is a sequence chart showing a third operation example in the system according to the second exemplary embodiment.

FIG. 9 is a block diagram showing a configuration example of a node according to the exemplary embodiments.

FIG. 10 is a block diagram showing another configuration example of the node according to the exemplary embodiments.

FIG. 11 is a block diagram showing a configuration example of an MTC server according to the exemplary embodiments.

FIG. 12 is a block diagram showing a configuration example of an MTC device according to the exemplary embodiments.

DESCRIPTION OF EMBODIMENTS

Hereinafter, first and second exemplary embodiments of the present invention will be described.

First Exemplary Embodiment

As shown in FIG. 1, a system according to this exemplary embodiment includes a 3GPP network 10, an MTC server 20, and a plurality of MTC devices 30.

The inventors of this application have found that in such a system, for example the following threats are identified for MTC device triggering.

<Threats>

The network triggers MTC devices to initiate communication with the MTC server based on a trigger indication sent from the MTC server (hereinafter, this indication will be sometimes referred to as "triggering message"). This will open a chance for an attacker, especially when the MTC server is outside the operator domain as shown in FIG. 1.

The attacker can impersonate the MTC server to send a false trigger indication to the network, and then the network is utilized by the attacker to trigger the corresponding MTC device(s). This will cause false decision on the MTC device which may lead to the waste of the MTC device's power consumption and even a DOS attack to the network, as a large number of MTC devices are triggered and required authentication at the same time. Thus the attackers can manipulate this to achieve their attack target.

An authorized MTC server may not have full control over a MTC device, if such MTC server inadvertently triggers a MTC device for e.g. updating software it can cause crucial damage to MTC device.

The attacker can eavesdrop privacy sensitive information such as MTC device identities on external interface.

In order to address these threats, especially when the MTC server is located outside the 3GPP operator domain, the following security requirements apply.

<Security Requirements>

The 3GPP network should be able to determine whether (1) the MTC server is authorized to communicate with the MTC device and (2) the MTC server is authorized to send the given trigger to the given MTC device.

There are described solutions which fulfill these security requirements for the key issue.

<Solutions>

The 3GPP network should keep a list of MTC servers authorized to send trigger to a given MTC device and the type of trigger the MTC server is authorized to send. The list should contain MTC device identity, MTC server identity and the related allowed triggering. This way, for each trigger, the 3GPP network can verify if the MTC server is allowed to send trigger and whether the trigger is authorized.

Next, there will be described details of this exemplary embodiment.

This exemplary embodiment caters for three main issues:
I. secure delivery of authorized MTC device triggering,
II. failure handling: retry of sending the triggering from network and MTC server to MTC device,
III. triggering detached (offline) MTC device.

A few assumptions are made as below.
1. MTC server is in/out of 3GPP domain network.
2. MTC device and network have mutual authentication.
3. MTC server and network have mutual authentication.

To achieve I (secure delivery of MTC device triggering), the trigger message should be integrity and may be confidentiality protected. The network performs integrity and confidentiality checks of the trigger.

Network then performs authorization of MTC server. Network is deployed with a list contains MTC device ID (identity), MTC server ID, and related information of subscription. MTC server will send the triggering containing the target MTC device ID, MTC server 1D, and optionally the subscription ID. When the network receives the triggering, it will perform authorization of MTC server according to the list, to verify if the MTC server is authorized to trigger the target MTC device and also if the MTC device is authorized to respond the triggering. Only when the authorization for MTC server, MTC device and the subscription (in case it appears) succeed, the network will proceed with MTC device triggering.

Network then performs authorization of the triggering message. The triggering message contains trigger type and trigger body. The trigger type consists of emergency level, subscription information and availability of aggregation/broadcast trigger/group trigger, etc. The trigger body contains the expected behavior of MTC device, e.g., to send back data, to update software, to attach to network, to detach from network, etc. The network checks the trigger type to verify if the trigger message is authorized to be sent to MTC device. After successful trigger type check, network will forward the trigger message to MTC device.

MTC device which receives the triggering indication (message) will also perform the integrity check and trigger type check to verify the validity of the trigger. Only after the validity is verified, the MTC device will respond to MTC server via network.

The network will also validate response from the MTC device to a MTC server. Here the validation is to check whether the given MTC device is allowed to communicate with the addressed MTC server. Any unauthorized or miscommunication will be informed to the user.

To achieve II (failure handling: retry of sending the triggering from network and MTC server to MTC device), when the trigger is failed to be delivered to MTC device and MTC server is notified, MTC server can retry to send the trigger. It can also require the network to retry of sending the trigger to MTC device. The trigger has a lifetime and when it is expired, the trigger should not be sent from MTC sever or network, and the MTC device which receives a trigger with expired lifetime should discard the trigger. The trigger lifetime is synchronized between MTC server and network. The frequency and upper limitation of how many times the trigger can be resent are defined and synchronized between MTC server and network.

Network will start the retry after received it from MTC server. Or alternatively MTC server indicates network if retry of sending triggering message to MTC device is required.

Normally the network can resend the trigger to the MTC device until the lifetime of the trigger and the MTC server will resend the trigger to the network after the lifetime of the trigger has ended.

In order to prevent replay attack, the receiver of the triggering message should be able to distinguish if it is a retry message or an original message. The triggering message should contain a parameter indicating its status (original or retry), and a counter of how many times it has been retried is defined in the retry messages.

Network sends a notification to MTC user if unauthorized triggering message is received from an authorized MTC server. The notification can be sent by any means, like SMS, email or recorded in a log. Any further unauthorized trigger should be discarded and if the MTC server keeps sending the unauthorized triggers, network should suspend the communication with it.

To achieve III (triggering detached (offline) MTC device), offline MTC devices are those that go to standby or sleep mode to save battery power as they might not be required or have anything to communicate for a given interval. This interval could be fixed in the sense that a MTC device wakes up periodically after the interval or it can be variable. For offline MTC device, it may not be necessary to be waken as soon as there is a triggering from MTC server, or may have to wake up immediately according to MTC server's requirement.

To determine when to send the trigger to MTC device, the network will first check the emergency level in the trigger type field. A trigger with a high emergency level will be sent to MTC device immediately. If the emergency level is low, the network will check if the offline timer (or time to attach) is valid, if not, the network will send the trigger immediately. If the offline tinier is valid, the network will wait for attach request from MTC device, which is sent after the timer is expired, before sending the trigger.

The time of attach is sent from network to MTC device, which can either be in the Detach Accept or Detach Request message (other messages could also exist). This timer can be informed to the network from the MTC server or agreed on at the time of subscription. Note that, the MTC device may inform the tinier to the network and the MTC server.

Unlike existing specification, a trigger can be sent to a MTC device even when detached thus the security context to be used for such emergency messages (or after offline timer expires) should be agreed on before the MTC device goes to detached state. The security context can be indicated or negotiated during detach procedure (e.g., Detach Accept or Detach Request message), so that MTC device can read the triggering message and also protect future messages.

Next, operation examples of this exemplary embodiment will be described in more detail with reference to FIGS. 2 to 4.

FIG. 2 shows an example of operations for the first issue of secure delivery of authorized MTC device trigger.

It is assumed that MTC device 30 and network 10 has mutual authentication (Step S11). Further, it is assumed that network 10 and MTC server 20 has mutual authentication (Step S12).

Network 10 stores a list of authorized MTC server. The list contains MTC server ID, ID of allowed target MTC device, subscription information, allowed trigger type to the MTC device (Step S13).

MTC server 20 sends a MTC device trigger to network 10 (Step S14).

Network 10 checks against the list to check whether the MTC server 20 is authorized to send the trigger to given MTC device 30 and if MTC device 30 is allowed to respond to the given type of trigger (Step S15). For example, the network 10 may verify that the MTC server 20 is allowed to send the given type of trigger, if an ID of the MTC server 20 included in the received trigger coincides with the MTC server ID included in the list, and if the trigger type included in the trigger coincides with the allowed trigger type included in the list. Further, the network 10 may verify that the MTC device 30 is allowed to respond to the trigger, if an ID of the MTC device 30 included in the trigger coincides with the MTC device ID included in the list.

Network 10 forwards the trigger message to MTC device 30 if the checks at Step S15 are passed (Step S16).

When MTC device 30 receives the trigger message, it performs integrity check and also checks the trigger type (Step S17).

MTC device 30 sends a proper response to network 10 (Step S18).

Network 10 checks against the list whether MTC device 30 is allowed to respond in the same way that. Step S15 does (Step S19).

Network 10 forwards the trigger response to MTC server 20 (Step S20).

FIG. 3 shows an example of operations for the second issue of failure handling.

It is assumed that MTC device 30 and network 10 has mutual authentication (Step S21). Further, it is assumed that network 10 and MTC server 20 has mutual authentication (Step S22).

MTC server 20 sends MTC device trigger message (Step S23). However, upon failing in delivering the trigger message, either network 10 (Step S24) or MTC server 20 (Step S25) can check whether the trigger lifetime is expired and/or retry counter is exceeded.

Specifically, network 10 checks whether the trigger lifetime is expired and/or retry counter has reached the limit (Step S24a). If none of Step S24a happens, network 10 will forward the retry message of trigger to MTC device 30 (Step S24b).

Alternatively, MTC server 20 performs the check as with the network 10 (Step S25a). If the check is passed, MTC server 20 retries sending trigger message to network 10 (Step S25b). Network 10 forwards the retry trigger message (Step S25c).

MTC device 30 verifies if the trigger is a retry message (Step S26).

When MTC device 30 received a retry trigger message which lifetime is expired or retry counter is exceed, it will discard the trigger (Step S27).

FIG. 4 shows an example of operations for the third issue of triggering offline MTC device.

It is assumed that MTC device 30 and network 10 has mutual authentication (Step S31). Further, it is assumed that network 10 and MTC server 20 has mutual authentication (Step S32).

During the detach procedure that MTC device 30 went offline (e.g. Detach Request or Detach Accept message sent from network 10 to MTC device 30), network 10 sends MTC device 30 the re-attach timer and security context indicator (Step S33a). Alternatively, MTC device 30 can send the re-attach timer to network 10 to inform when it will attach to network 10 next time (Step S33b).

MTC device 30 is offline (Step S34).

MTC server 20 sends a MTC device trigger message to the offline MTC device 30. The message contains the trigger type (Step S35).

Network 10 will check the trigger's emergency level (Step S36). If it has high emergency level (Step S37), network 10 forwards the trigger message immediately (Step S38).

If the trigger has low emergency level (Step S39), network 10 checks the re-attach timer (Step S39a). Network 10 waits for the re-Attach request from MTC device 30 before the re-attach timer is expired (Step S39b). Then, network 10 will forward the trigger message (Step S39c).

Second Exemplary Embodiment

As shown in FIG. 5, in a system according to this exemplary embodiment, the network 10 includes a MTC-IWF (Inter-Working Function) 40. The MTC-IWF 40 serves as a node relaying messages between the MTC device 30 and an SCS (Service Capability Server) 60. The SCS 60 serves as the MTC server 20 shown in FIG. 1. The network 10 includes, as other nodes, an HSS (Home Subscriber Server), an MME (Mobility Management Entity), an SGSN (Serving GPRS (General Packet Radio Service) Support Node), an MSC (Mobile Switching Centre) and the like. In the following description, the MME, SGSN and MSC are sometimes referred to as "MME/SGSN/MSC" and collectively denoted by the symbol 50. Communication between the MTC device 30 and the MTC-IWF 40 is conducted through the MME/SGSN/MSC 50 and a RAN (Radio Access Network). Note that, the MTC device 30 is a UE (User Equipment) equipped for MTC.

Next, operation examples of this exemplary embodiment will be described in detail with reference to FIGS. 6 to 8.

FIG. 6 shows an example of operations for the first issue of secure delivery of authorized MTC device trigger.

It is assumed that MTC device 30 and MME/SGSN/MSC 50, MTC-IWF 40 has mutual authentication (Step S41). Further, it is assumed that MTC-IWF 40 and SCS 60 has mutual authentication (Step S42).

MTC-IWF 40 stores a list of authorized MTC server (SCS in this example). The list contains MTC server ID (SCS ID in this example), ID of allowed target MTC device, subscription information, allowed trigger type to the MTC device (Step S43).

SCS 60 sends a MTC device trigger to MTC-IWF 40 (Step S44).

MTC-IWF 40 checks against the list whether the SCS 60 is authorized to send the given type of trigger to the target MTC device 30 and if MTC device 30 is allowed to respond to the given type of trigger from the SCS 60 (Step S45).

MTC-IWF 40 forwards the trigger message to MTC device 30 if the checks at Step S45 are passed (Step S46).

When MTC device 30 receives the trigger message, it performs integrity check and also checks the trigger type (Step S47).

MTC device 30 sends a proper response to MTC-IWF 40 (Step S48).

MTC-IWF 40 checks whether MTC device 30 is allowed to respond (Step S49).

MTC-IWF 40 forwards the trigger response to SCS 60 (Step S50).

FIG. 7 shows an example of operations for the second issue of failure handling.

It is assumed that MTC device 30 and MME/SGSN/MSC 50, MTC-IWF 40 has mutual authentication (Step S51). Further, it is assumed that MTC-IWF 40 and SCS 60 has mutual authentication (Step S52).

SCS 60 sends MTC device trigger message to MTC-IWF 40 (Step S53). Then, MTC-IWF 40 forwards the MTC device trigger message (Step S54). However, upon failing in delivering the trigger message, either MTC-IWF 40 (Step S55) or SCS 60 (Step S56) can check whether the trigger lifetime is expired and/or retry counter is exceeded.

Specifically, MTC-IWF 40 checks whether the trigger lifetime is expired and/or retry counter has reached the limit (Step S55a). If none of Step S55a happens, MTC-IWF 40 will forward the retry message of trigger to MTC device 30 (Step S55b).

Alternatively, SCS 60 performs the check as with the MTC-IWF 40 (Step S56a). If the check is passed, SCS 60 retries sending trigger message to MTC-IWF 40 (Step S56b). MTC-IWF 40 forwards the retry trigger message (Step S56c).

MTC device 30 verifies if the trigger is a retry message (Step S57).

When MTC device 30 received a retry trigger message which lifetime is expired or retry counter is exceed, it will discard the trigger (Step S58).

FIG. 8 shows an example of operations for the third issue of triggering offline MTC device.

It is assumed that MTC device 30 and MME/SGSN/MSC 50, MTC-IWF 40 has mutual authentication (Step S61). Further, it is assumed that MTC-IWF 40 and SCS 60 has mutual authentication (Step S62).

During the detach procedure that MTC device 30 went offline (e.g. Detach Request or Detach Accept message sent from network 10 to MTC device 30), MME/SGSN/MSC 50 sends MTC device 30 the re-attach timer and security context indicator (Step S63*a*). Alternatively, MTC device 30 can send the re-attach timer to MME/SGSN/MSC 50 to inform when it will attach to network 10 next time (Step S63*b*).

MTC device 30 is offline (Step S64).

MME/SGSN/MSC 50 sends the re-attach timer to the MTC-IWF 40 (Step S65).

SCS 60 sends a MTC device trigger message to the offline MTC device 30. The message contains the trigger type (Step S66).

MTC-IWF 40 will check the trigger's emergency level (Step S67). If it has high emergency level (Step S68), MTC-IWF 40 forwards the trigger message immediately (Step S68*a*).

If the trigger has low emergency level (Step S69), MTC-IWF 40 checks the re-attach timer (Step S69*a*). If there is an Attach request from MTC device 30 before the re-attach timer is expired (Step S69*b*), then MTC-IWF 40 will forward the trigger message (Step S69*c*).

Next, configuration examples of the MTC-IWF 40, the MME/SGSN/MSC 50, the MTC server 20 (SCS 60) and the MTC device 30 according to above-mentioned exemplary embodiments will be subsequently described with reference to FIGS. 9 to 12.

As shown in FIG. 9, the MTC-IWF 40 includes a storing unit 41 and a verifying unit 42 for the first issue of secure delivery of authorized MTC device trigger. The storing unit 41 stores the list. The verifying unit 42 verifies whether the MTC server 20 (SCS 60), the MTC device 30 and the type of triggering message are authorized ones by checking against the list. As substitutes for or in addition to the units 41 and 42, the MTC-IWF 40 includes a checking unit 43 and a re-forwarding unit 44 for the second issue of failure handling. The checking unit 43 checks the trigger lifetime and/or the retry counter. The re-forwarding unit 44 re-forwards the triggering message when the trigger lifetime is not expired and/or the retry counter is not exceeded. As substitutes for or in addition to the units 41, 42 and 44, the MTC-IWF 40 includes the checking unit 43 and a determining unit 45 for the third issue of triggering offline MTC device. In this case, the checking unit 43 checks the emergency level. The determining unit 45 determines a timing to forward the triggering message in accordance with the emergency level. Further, the MTC-IWF 40 may include an informing unit 46. The informing unit 46 informs the MTC device 30 of the re-attach timer. Note that the units 41 to 46 are mutually connected with each other thorough a bus or the like. These units 41 to 46 can be configured by, for example, transceivers which respectively conduct communication with the MTC server 20 and the MTC device 30, and a controller which controls these transceivers to execute the processes shown at Steps S11 to S16, S19 and S20 in FIG. 2, the processes shown at Step S21 to S25 in FIG. 3, the processes shown at Steps S31 to S39 in FIG. 4, the processes shown at Steps S41 to S46 and S48 to S50 in FIG. 6, the processes shown at Steps S51 to S56 in FIG. 7, the processes shown at Steps S61, S62 and S65 to S69 in FIG. 8, or processes equivalent thereto.

As shown in FIG. 10, the MME/SGSN/MSC 50 includes an instructing unit 51. The instructing unit 51 instructs the MTC device 30 on the security context. The unit 51 can be configured by, for example, transceivers which respectively conduct communication with the MTC device 30 and the MTC-IWF 40, and a controller which controls these transceivers to execute the processes shown at Steps S63 and S65 in FIG. 8, or processes equivalent thereto.

Further, as shown in FIG. 11, the MTC server 20 (SCS 60) includes a checking unit 21 and a resending unit 22 for the second issue of failure handling. The checking unit 21 checks the trigger lifetime and/or the retry counter. The resending unit 22 resends the triggering message when the trigger lifetime is not expired and/or the retry counter is not exceeded. As substitutes for or in addition to the units 21 and 22, the MTC server 20 includes an including unit 23 for the third issue of triggering offline MTC device. The including unit 23 includes the emergency level in the triggering message. Note that the units 21 to 23 are mutually connected with each other thorough a bus or the like. These units 21 to 23 can be configured by, for example, a transceiver which conducts communication with the MTC-IWF 40, and a controller which controls this transceiver to execute the processes shown at Step S22, S23 and S25 in FIG. 3, the processes shown at Steps S32, S33 and S35 in FIG. 4, the processes shown at Steps S52, S53 and S56 in FIG. 7, the processes shown at Steps S6:2 and S66 in FIG. 8, or processes equivalent thereto.

Furthermore, as shown in FIG. 12, the MTC device 30 includes a checking unit 31 and a sending unit 32 for the first issue of secure delivery of authorized MTC device trigger. The checking unit 31 performs the integrity and trigger type check. The sending unit 32 sends the response to the MTC-IWF 40 when the check is passed. As substitutes for or in addition to the units 31 and 32, the MTC device 30 includes a discarding unit 33 for the second issue of failure handling. The discarding unit 33 discards the triggering message when the trigger lifetime is expired or the retry counter is exceeded. The MTC device 30 may include a verifying unit 34. The verifying unit 34 verifies if the trigger message is the retry message by referring to the above-mentioned status (original or retry). As substitutes for or in addition to the units 31 to 34, the MTC device 30 includes an informing unit 35 for the third issue of triggering offline MTC device. The informing unit 35 informs the MTC-IWF 40 of the re-attach timer. Note that the units 31 to 35 are mutually connected with each other thorough a bus or the like. These units 31 to 35 can be configured by, for example, a transceiver which conducts communication with the MTC-IWF 40, and a controller which controls this transceiver to execute the processes shown at Steps S11 and S16 to S18 in FIG. 2, the processes shown at Step S21 and S23 to S27 in FIG. 3, the processes shown at Steps S31, S33, S34 and S37 to S39 in FIG. 4, the processes shown at Steps S41 and S46 to S48 in FIG. 6, the processes shown at Steps S51 and S54 to S58 in FIG. 7, the processes shown at Steps S61, S63, S64, S68 and S69 in FIG. 8, or processes equivalent thereto.

Note that the present invention is not limited to the above-mentioned exemplary embodiments, and it is obvious that various modifications can be made by those of ordinary skill in the art based on the recitation of the claims.

This application is based upon and claims the benefit of priority from Japanese patent application No. 2011-236699, filed on Oct. 28, 2011, the disclosure of which is incorporated herein in its entirety by reference.

The whole or part of the exemplary embodiments disclosed above can be described as, but not limited to, the following supplementary notes.

(Supplementary Note 1)
Validation of the Trigger at the Network:
Network performs authorization to both MTC server and the trigger to verify if the trigger is from an authorized MTC server and valid.

(Supplementary Note 2)
Validation of the trigger at the MTC device
MTC device verifies both if the trigger is from an authorized MTC server and the validity of the trigger according to its subscription.

(Supplementary Note 3)
Validation of the message from MTC device to the MTC server at the network (Supplementary Note 4)
MTC server and network retry of sending the MTC device triggering message upon e.g. network failure, meanwhile the trigger's freshness is kept.

(Supplementary Note 5)
Network notifies MTC user about receiving of unauthorized trigger and can suspend further communication with the MTC server which sent the trigger. The notification can be in any means like through SMS, email or being recorded in a log.

(Supplementary Note 6)
Network sends trigger to detached (offline) MTC device according to emergency level and timer for attach.

(Supplementary Note 7)
Network indicates the security context in the messages to be used in the next communication.

REFERENCE SIGNS LIST

10 NETWORK.
20 MTC SERVER
21, 31, 43 CHECKING UNIT
22 RECENDING UNIT
23 INCLUDING UNIT
30 MTC DEVICE
32 SENDING UNIT
33 DISCARDING UNIT
34, 42 VERIFYING UNIT
35, 46 INFORMING UNIT
40 MTC-IWF
41 STORING UNIT
44 RE-FORWARDING UNIT
45 DETERMINING UNIT
50 MME/SGSN/MSC
51 INSTRUCTING UNIT
60 SCS

The invention claimed is:

1. A SCS (Service Capability Server) in a mobile communication system, the SCS comprising:
a memory storing instructions:
a processor configured to process the instructions to:
send, to a MTC-IWF (Machine Type Communication-Inter Working Function), a trigger message including a time period for which the trigger message is valid, and
perform mutual authentication between the MTC-IWF and the SCS,
wherein a delivery of the trigger message to a UE (User Equipment) is re-attempted if the delivery fails within the time period.

2. The SCS of claim 1, wherein the MTC-IWF checks whether the SCS is authorized to send the trigger message, and sends the trigger message to the UE via a MME (Mobility Management Entity) or a SGSN (Serving GPRS Support Node).

3. A method of a SCS (Service Capability Server) in a mobile communication system, the method comprising:
sending, to a MTC-IWF (Machine Type Communication-Inter Working Function), a trigger message including a time period for which the trigger message is valid; and
performing mutual authentication between the MTC-IWF and the SCS,
wherein a delivery of the trigger message to a UE (User Equipment) is re-attempted if the delivery fails within the time period.

4. The method of claim 3, wherein the MTC-IWF checks whether the SCS is authorized to send the trigger message, and sends the trigger message to the UE via a MME (Mobility Management Entity) or a SGSN (Serving GPRS Support Node).

5. A MTC-IWF (Machine Type Communication-Inter Working Function) in a mobile communication system, the MTC-IWF comprising:
a memory storing instructions;
a processor configured to process the instructions to:
receive, from a SCS (Service Capability Server), a trigger message including a time period for which the trigger message is valid, and
check whether the server is authorized to send the trigger message, and to send the trigger message to a UE (User Equipment) via a MME (Mobility Management Entity) or a SGSN (Serving GPRS Support Node),
wherein a delivery of the trigger message to a UE (User Equipment) is re-attempted if the delivery fails within the time period.

6. The MTC-IWF of claim 5, wherein the trigger message includes an identifier of the UE.

7. A method of a MTC-IWF (Machine Type Communication-Inter Working Function) in a mobile communication system, the method comprising:
receiving, from a SCS (Service Capability Server), a trigger message including a time period for which the trigger message is valid;
checking whether the server is authorized to send the trigger message; and
sending the trigger message to a UE (User Equipment) via a MME (Mobility Management Entity) or a SGSN (Serving GPRS Support Node),
wherein a delivery of the trigger message to a UE (User Equipment) is re-attempted if the delivery fails within the time period.

8. The method of claim 7, wherein the trigger message includes an identifier of the UE.

9. A UE (User Equipment) in a mobile communication system, the UE comprising:
a memory storing instructions:
a processor configured to process the instructions to:
receive a delivery of a trigger message from a MTC-IWF (Machine Type Communication-Inter Working Function) via a MME (Mobility Management Entity) or a SGSN (Serving GPRS Support Node), and
send a trigger response to the MTC-IWF via the MME or the SGSN in response to the delivery, wherein a SCS (Service Capability Server) sends, to the MTC-IWF, a trigger message Including a time period for which the trigger message is valid, and wherein the delivery is re-attempted if the delivery-fails within the time period.

10. The UE of claim 9, wherein the MTC-IWF checks whether the SCS is authorized to send the trigger message.

11. A method of a UE (User Equipment) for a mobile communication system, the method comprising:

receiving a delivery of a trigger message from a MTC-IWF (Machine Type Communication-Inter Working Function) via a MME (Mobility Management Entity) or a SGSN (Serving GPRS Support Node); and sending a trigger response to the MTC-IWF via the MME or the SGSN in response to the delivery, wherein a SCS (Service Capability Server) sends, to the MTC-IWF, the trigger message including a time period for which the trigger message is valid, and wherein the delivery is re-attempted if the delivery-fails within the time period.

12. The method of claim 11, wherein the MTC-IWF checks whether the SCS is authorized to send the trigger message.

\* \* \* \* \*